(12) United States Patent
Frangenheim et al.

(10) Patent No.: US 10,467,834 B2
(45) Date of Patent: Nov. 5, 2019

(54) METHOD FOR THE INTERVENTION-FREE CONTROL OF A VEHICLE LOCKING SYSTEM WITH A MOBILE TERMINAL DEVICE

(71) Applicant: Deutsche Post AG, Bonn (DE)

(72) Inventors: Jens Frangenheim, Merken (DE); Florian Schulz, Aachen (DE)

(73) Assignee: Deutsche Post AG, Bonn (DE)

( * ) Notice: Subject to any disclaimer, the term of this patent is extended or adjusted under 35 U.S.C. 154(b) by 0 days.

(21) Appl. No.: 16/019,921

(22) Filed: Jun. 27, 2018

(65) Prior Publication Data
US 2019/0005754 A1    Jan. 3, 2019

(30) Foreign Application Priority Data
Jun. 28, 2017   (DE) .................. 10 2017 114 419

(51) Int. Cl.
*B60R 25/24*   (2013.01)
*G07C 9/00*    (2006.01)
(Continued)

(52) U.S. Cl.
CPC .......... *G07C 9/00309* (2013.01); *B60R 25/04* (2013.01); *B60R 25/245* (2013.01);
(Continued)

(58) Field of Classification Search
CPC ............ G07C 9/00309; G07C 9/00119; G07C 9/00896; H04W 4/70; H04W 4/80;
(Continued)

(56) References Cited

U.S. PATENT DOCUMENTS

| 5,973,611 A | 10/1999 | Kulha et al. |
| 8,126,450 B2 | 2/2012 | Howarter et al. |

(Continued)

FOREIGN PATENT DOCUMENTS

| CN | 105644504 A | 6/2016 |
| CN | 106850228 A | 6/2017 |

(Continued)

OTHER PUBLICATIONS

German Office Action issued in related DE10 2017 114 419.6 Application dated Mar. 16, 2018.

(Continued)

*Primary Examiner* — Nabil H Syed
(74) *Attorney, Agent, or Firm* — Woodard, Emhardt, Henry, Reeves & Wagner, LLP

(57) ABSTRACT

The subject-matter of the disclosure is a method for the intervention-free control of a vehicle locking system with a mobile terminal device, with the following steps: checking whether the mobile terminal device is located in a surrounding area of the vehicle, if so, authorizing the mobile terminal device in relation to the vehicle by means of a secured wireless point-to-point, two-way communication connection secured with a security key, and opening or locking the vehicle by means of the vehicle locking system if a difference between a current location position of the vehicle and a current location position of the mobile terminal device falls below or exceeds a predefined value in the surrounding area.

10 Claims, 1 Drawing Sheet

(51) Int. Cl.
*H04W 4/70* (2018.01)
*H04W 4/80* (2018.01)
*H04W 4/40* (2018.01)
*B60R 25/04* (2013.01)
*B60R 25/31* (2013.01)
*H04L 9/32* (2006.01)
*H04W 4/02* (2018.01)

(52) U.S. Cl.
CPC .......... *B60R 25/31* (2013.01); *G07C 9/00119* (2013.01); *G07C 9/00896* (2013.01); *H04L 9/3268* (2013.01); *H04W 4/027* (2013.01); *H04W 4/40* (2018.02); *H04W 4/70* (2018.02); *H04W 4/80* (2018.02); *G07C 2009/00349* (2013.01); *G07C 2009/00412* (2013.01); *G07C 2209/62* (2013.01); *G07C 2209/63* (2013.01)

(58) Field of Classification Search
CPC ........ H04W 4/40; B60R 25/04; B60R 25/245; B60R 25/31
See application file for complete search history.

(56) References Cited

U.S. PATENT DOCUMENTS

| | | | |
|---|---|---|---|
| 9,592,736 | B2 | 3/2017 | Broecker |
| 2010/0075655 | A1* | 3/2010 | Howarter ............ B60R 25/2009 455/420 |
| 2010/0075656 | A1 | 3/2010 | Howarter et al. |
| 2012/0139702 | A1* | 6/2012 | Stevenson ................ A61N 1/08 340/5.61 |
| 2013/0099892 | A1* | 4/2013 | Tucker ............... G07C 9/00309 340/5.61 |
| 2014/0067161 | A1* | 3/2014 | Conner .................. B60R 25/20 701/2 |
| 2014/0114504 | A1* | 4/2014 | Yamashita .............. B60R 25/40 701/2 |
| 2014/0285319 | A1* | 9/2014 | Khan ................. G07C 9/00309 340/5.61 |
| 2017/0249792 | A1* | 8/2017 | Gennermann .......... B60R 25/24 |
| 2017/0259786 | A1 | 9/2017 | Burgkhardt |
| 2018/0148015 | A1 | 5/2018 | Weghaus |
| 2019/0005754 | A1 | 1/2019 | Frangenheim |

FOREIGN PATENT DOCUMENTS

| | | |
|---|---|---|
| DE | 19860350 B4 | 8/2008 |
| DE | 10 2014 209 210 A1 | 11/2015 |
| DE | 10 2014 112 849 A1 | 3/2016 |
| DE | 102014018057 A1 | 6/2016 |
| DE | 102015015886 A1 | 7/2016 |
| DE | 10 2015 109 468 A1 | 12/2016 |
| EP | 0 905 337 A1 | 3/1999 |
| EP | 3 422 301 A1 | 1/2019 |
| FR | 3006794 A1 | 12/2014 |
| WO | WO 2016/087168 A1 | 6/2016 |
| WO | WO 2017/065202 A1 | 4/2017 |

OTHER PUBLICATIONS

Machine translation of German Office Action received in related DE 10 2017 114 419.6 application provided by foreign associate dated Jun. 22, 2018.
Chinese Office Action issued in related CN10 2017 114 419.6 Application dated Mar. 16, 2018.
Machine translation of Chinese Office Action received in related CN 10 2017 114 419.6 application provided by foreign associate dated Jun. 22, 2018.
Machine translation of DE102014018057A1 by Lexis Nexis Total Patent on Jun. 25, 2018.
Machine translation of DE19860350B4 by Lexis Nexis Total Patent on Jun. 25, 2018.
Machine translation of WO2017068202 by Patent Translation, European Patent Office on Feb. 18, 2019 (40 pgs.).
Office Action issued by German Patent Office dated Mar. 16, 2018 in related application DE 10 2017 114 419.6.
Search report issued by European Patent Office dated Nov. 14, 2018 in related EP 18179488.4.
Chinese Search Report issued in related CN201810689537.1 dated Apr. 25, 2019.
Machine translation of CN105644504A by Patent Translate European Patent Office on Jul. 29, 2019 (pp. 34).
Machine translation of CN106850228A by Patent Translate European Patent Office on Jul. 30, 2019 (pp. 42).
Machine translation of DE102015015886 Al by Patent Translate European Patent Office on Jul. 30, 2019 (p. 16).
Machine translation of FR3006794A1 by Patent Translate European Patent Office on Jul. 30, 2019 (pp. 24).
Partial translation of Chinese Office Action issued in related CN201810689537.1 dated Apr. 25, 2019.

* cited by examiner

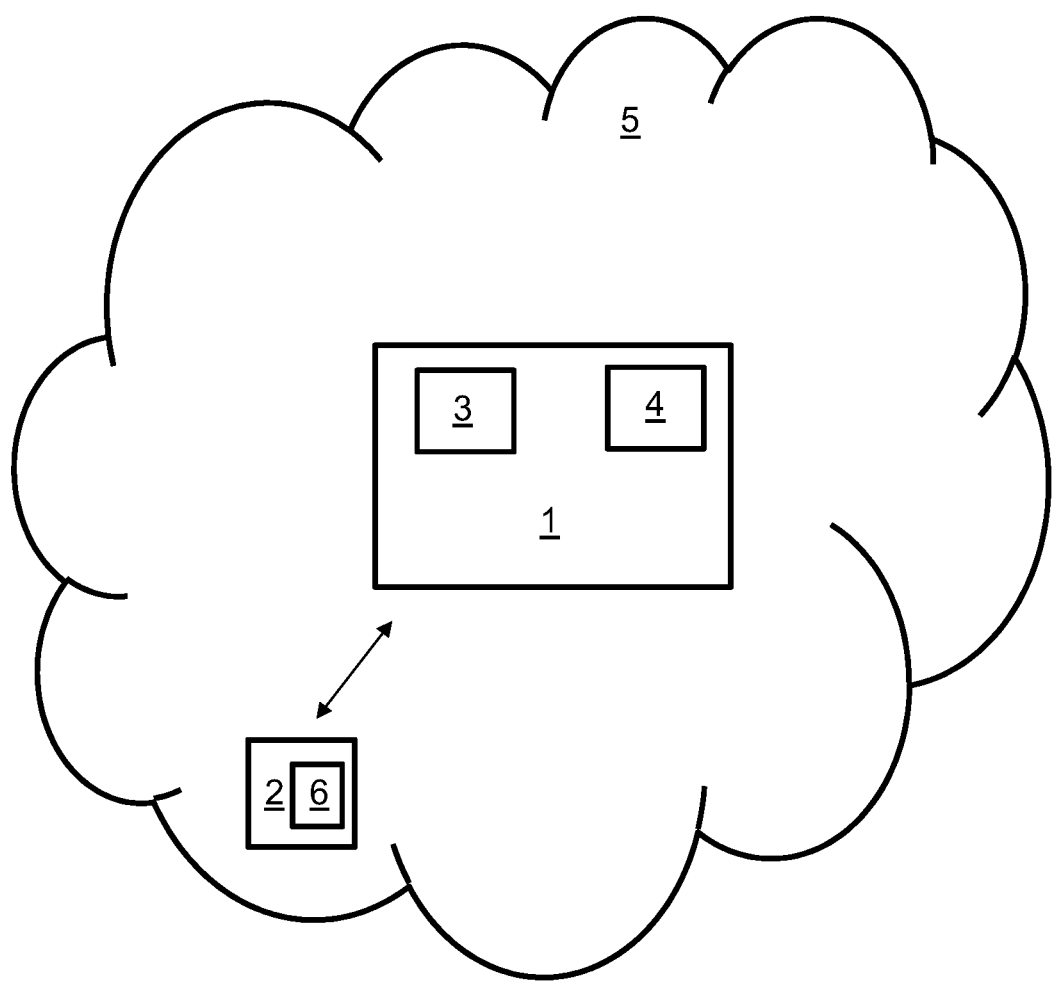

METHOD FOR THE INTERVENTION-FREE CONTROL OF A VEHICLE LOCKING SYSTEM WITH A MOBILE TERMINAL DEVICE

CROSS-REFERENCE TO RELATED APPLICATIONS

This application claims the foreign priority benefit of German Patent Application No. 10 2017 114 419.6 filed Jun. 28, 2017, which is hereby incorporated by reference.

TECHNICAL FIELD

The invention relates to a method for the intervention-free control of a vehicle locking system with a mobile terminal device, with the steps of checking whether the mobile terminal device is located in a surrounding area of the vehicle and, if so, authorizing the mobile terminal device in relation to the vehicle by means of a wireless point-to-point, two-way communication connection secured with a security key.

BACKGROUND

Systems and methods for opening and starting a vehicle by means of a mobile terminal device are known from the prior art and are marketed, for example, under the brand name Keyless Go in order to make the handling of vehicle fleets or car sharing offerings more efficient. A digital vehicle key of the vehicle is normally integrated into the mobile terminal device. The digital key can be transmitted via a mobile radiocommunication network onto the mobile terminal device of the car-sharing user. Following a data exchange between the mobile terminal device of the user and the vehicle, for example via a near-field communication connection, the vehicle can be opened and can be started by the user.

However, despite the much-vaunted security, the aforementioned systems and methods have various security shortcomings. Accordingly, cases of misuse have increasingly been reported in recent years in which unauthorized parties have opened or even stolen the vehicle.

SUMMARY

Against this background, one object of the present invention is to indicate a method for the intervention-free control of a vehicle locking system with a mobile terminal device which is essentially more secure but nevertheless equally simple compared with methods and systems known from the prior art.

The object is achieved by means of the features of the independent claim. Advantageous designs are set out in the subclaims.

The object is achieved accordingly by a method for the intervention-free control of a vehicle locking system with a mobile terminal device, wherein the method has the following steps: checking whether the mobile terminal device is located in a surrounding area of the vehicle and, if so, particularly in the surrounding area, authorizing the mobile terminal device in relation to the vehicle by means of a wireless point-to-point, two-way communication connection secured with a security key, and opening or locking the vehicle by means of the vehicle locking system if a difference between a current location position of the vehicle and a current location position of the mobile terminal device falls below or exceeds a predefined value in the surrounding area.

Compared with methods for opening or locking a vehicle known from prior art, the proposed method is characterized in that the opening or locking of the vehicle is carried out only if a double plausibility check is successfully carried out. On the one hand, the mobile terminal device must have authorized itself in relation to the vehicle in the spatially restricted surrounding area via a direct communication connection in which one connection path suffices, entirely without intermediate stations. On the other hand, a check is carried out to determine whether the mobile terminal device is located within a tolerable distance from the vehicle, based on its current location position. This means that a so-called radiocommunication range extension attack for the unauthorized opening of the vehicle, in which an attacker transmits a location position supposedly located in the surrounding area but actually at a greater distance would be to no avail, since it is detected by means of the aforementioned plausibility checks that the vehicle is intended to be opened without authorization.

In other words, compared with the methods and systems known from the prior art, the proposed method, with an equally simple intervention, offers a substantially improved security against an unauthorized opening and starting of the vehicle. The proposed method is furthermore characterized in that the vehicle can essentially be opened or locked without further interaction of a user or driver of the vehicle. After the mobile terminal device is authorized in relation to the vehicle within the surrounding area, the vehicle is opened or locked automatically after the predefined value has been understepped or exceeded. For this purpose, it is assumed according to the invention that the mobile terminal device is located in the area of authority of the driver or user of the vehicle. It may similarly be possible for the vehicle to be opened only if the user has previously confirmed the opening manually on the mobile terminal device.

The method can essentially be applied to any vehicle, but in particular to a motor vehicle, a car, an electric vehicle, a delivery vehicle, a bus and/or to a heavy goods vehicle. The vehicle locking system preferably has electromechanical devices for opening and/or locking the vehicle, in particular a door, a window and/or a tailgate of the vehicle. The vehicle preferably has a controller, in particular a computer-aided controller, comprising, for example, a microprocessor, a programmable logic controller and/or a microcontroller which is configured, on the one hand, to control the vehicle locking system, to determine the location position of the vehicle and/or to set up the secured wireless point-to-point, two-way communication connection to the mobile terminal device and/or to check whether the mobile terminal device is located in the surrounding area of the vehicle.

The surrounding area is preferably characterized by a range of the wireless point-to-point, two-way communication connection and may, for example, be 10 m, 50 m, 100 m or 250 m. The wireless communication connection is preferably designed by means of a wireless local network, also referred to as a WLAN, in particular according to an IEEE-802.11 standard, and/or IEEE-802.15.1 standard. In the case of a WLAN, in a simple and low-cost design, the vehicle can comprise a WLAN hotspot and the mobile device a corresponding WLAN client. In this case, the step of checking whether the mobile terminal device is located in the surrounding area of the vehicle can comprise a check of the mobile terminal device to determine whether it can connect to a WLAN hotspot by means of a WLAN key as a security key. The security key can be designed as a WEP, WPA or WPA2 key. During the authorization of the mobile terminal device in relation to the vehicle, a check can also be carried out to determine whether a MAC address of the mobile terminal device is authorized by the vehicle.

A point-to-point connection is understood according to the invention to mean a direct connection in the true sense of the word, wherein the connection path suffices entirely without an intermediate station and/or the communication between the mobile terminal device and the vehicle takes place exclusively in the Layer 1-3 network layers of the OSI model. In this respect, no external servers, such as, for example, RADIUS servers, are required to check the authorization, as a result of which the implementation of the method is very simple. The method preferably comprises the further step of setting up the wireless point-to-point, two-way communication connection secured with the security key between the mobile terminal device and the vehicle. The mobile terminal device is preferably designed as a Smartphone, tablet, wireless radiocommunication terminal device or handheld device.

The current location position of the vehicle and/or the mobile terminal device is preferably received by receiving a GPS, GLONASS, Galileo, Beidou and/or a further satellite signal. For this purpose, the mobile terminal device preferably comprises a satellite signal receiver, in particular for receiving the aforementioned GPS, GLONASS, Galileo, Beidou and/or further satellite signal. The satellite signals from different satellites can similarly be compared with one another in order to determine the location position and/or a validity of the location position. According to the invention, the term "current" or "currently" means that the location position is determined at the specific time when the difference is calculated. Similarly, the term "current" or "currently" can also include the meaning that the location position was determined immediately before the calculation of the difference, for example 10, 30 or 60 seconds earlier. The predefined value preferably represents a tolerable distance between the vehicle and the mobile terminal device, for example 5 m, 10 m, 50 m or 100 m, within which the vehicle is opened or locked without intervention.

According to one preferred development, the method comprises the step of transmitting a current location position of the mobile terminal device from the mobile terminal device via the secured wireless point-to point, two-way communication connection to the vehicle. In this connection, according to one preferred development, it is furthermore preferred that the current location position of the mobile terminal device is transmitted only if the location position of the mobile terminal device changes or a location position determined by a motion sensor of the mobile terminal device changes simultaneously with a location position determined from a satellite signal received by the mobile terminal device. The mobile terminal device preferably comprises the motion sensor by means of which it can be determined whether the location position of the mobile terminal device changes. It can be ensured by means of the aforementioned development that the vehicle is opened or locked only if the driver moves towards the vehicle or away from the vehicle, in any event not remaining in a stationary position.

On the basis of this realization, it is provided according to one preferred development that the method comprises the step of opening or locking the vehicle if the difference between the current location position of the vehicle and the current location position of the mobile terminal device decreases or increases in the surrounding area. As in the method step described above, the security of the proposed method can also be increased through this development in that the vehicle is opened or locked only if, for example, the driver approaches the vehicle or moves away from it. A change in the location position of the vehicle can be detected by means of a rotational movement of a vehicle tyre.

According to another preferred development, the method comprises the step, following the opening or locking of the vehicle, of transmitting a notification from the vehicle to the mobile terminal device and outputting the notification as a visual, audible and/or vibration signal on the mobile terminal device. If the driver gets out of the vehicle and subsequently leaves the surrounding area, he is informed of the performed or successful locking of the vehicle. Since the driver, together with the mobile terminal device, has left the surrounding area in which the secured wireless point-to-point, two-way communication connection is set up between the mobile device and the vehicle, the notification is preferably transmitted by means of a mobile radiocommunication network connection from the vehicle to the mobile terminal device.

According to an even more preferred design, the method comprises the following step: when the vehicle is opened, transmitting a notification from the vehicle to the mobile terminal device, outputting the notification as a visual, audible and/or vibration signal on the mobile terminal device, and, when the notification is acknowledged, transmitting a locking notification, in particular via a mobile radiocommunication network, from the mobile terminal device to the vehicle, and locking the vehicle by means of the vehicle locking system. If an unauthorized opening of the vehicle nevertheless occurs, the driver has the facility according to the proposed development to effect the locking of the vehicle by acknowledging the notification.

According to another preferred development, it is furthermore preferred, in order to increase security, that the method comprises the following step: following the opening of the vehicle, checking whether a driver is located on a driver's seat of the vehicle and, if so, releasing an ignition of the vehicle to start the vehicle. The ignition is therefore released only after the driver has sat down on the driver's seat.

According to a further design, it is preferred in this connection that the method comprises the following step: checking whether a secured near-field communication connection is possible between the mobile terminal device and the vehicle in a vehicle passenger compartment and, if so, releasing an ignition of the vehicle to start the vehicle, and/or triggering of the near-field communication connection by the vehicle by means of a secured code transmission to the mobile terminal device. Whereas a wireless point-to-point connection, for example by means of a WLAN or Bluetooth, was preferred in the method steps described above for authorizing and opening or locking the vehicle, the method step now proposed is based on a near-field communication connection, for example according to the NFC protocol or a different short-range signal with a range of, for example, 1 m. Once it has been established that the mobile terminal device is located, for example, in a trouser pocket of the driver in the vehicle passenger compartment, ignition release can be granted. The possibility of an unauthorized third party granting an ignition release to start the vehicle can be excluded by means of a near-field communication connection of this type. In this connection, it can be provided that the vehicle triggers the setting up of the near-field communication connection, particularly if the mobile terminal device is located within the predefined distance from the vehicle passenger compartment.

According to another further preferred design, the method comprises the following step: if the mobile terminal device is not located in the surrounding area, locking the vehicle by means of the vehicle locking system. As mentioned above, it is thereby achieved that the vehicle is locked automatically if the driver with the mobile terminal device has moved away from the surrounding area, for example after he has got out of the vehicle.

As similarly mentioned above, the method furthermore comprises the following preferred step: determining the location position of the mobile terminal device and/or the vehicle by means of a satellite signal currently received by the mobile terminal device and/or the vehicle. The mobile terminal device and/or the vehicle preferably has/have a corresponding satellite signal receiver.

According to an even more preferred design, the method comprises the following step: generating the security key, in particular a TLS or PGP certificate, in the vehicle, displaying of the security key by the vehicle, scanning in by the mobile terminal device of the security key displayed by the vehicle, and/or transmitting the security key from the vehicle onto the mobile terminal device. By means of the proposed steps, the security key can be generated and/or exchanged in a simple manner by the vehicle driver himself without the need for assistance from third parties such as complex server infrastructures. The key can be displayed on the instrument cluster of the vehicle and from there it can be scanned, for example via a QR code, by the mobile terminal device and can be installed on the latter. An integrity and confidentiality of the security key is thus maintained without unauthorized third parties gaining access to the security key.

According to a further preferred design, the method comprises the following step: if the current location position of the mobile terminal device is unavailable, after receiving a manual confirmation on the mobile terminal device, transmitting to the vehicle a manually confirmed location position of the mobile terminal device or a last-known location position of the mobile terminal device from the mobile terminal device via the secured wireless point-to-point, two-way communication connection as the current location position of the mobile terminal device. If no current location position of the mobile terminal device is available, for example because the driver with the mobile terminal device is located inside a building and in this respect has no satellite signal reception to receive the location position, the location position can be confirmed manually as the current location position by means of a manual confirmation and the mobile terminal device or a last-known location position can be used. The same applies to unavailability of the current location position of the vehicle.

BRIEF DESCRIPTION OF THE DRAWINGS

The invention is explained in detail below on the basis of a preferred example embodiment with reference to the attached drawing.

In the drawing:

FIG. 1 shows a schematic representation with a vehicle and a mobile terminal device for carrying out a method according to one preferred example embodiment of the invention in a schematic view.

DETAILED DESCRIPTION OF THE DRAWINGS

FIG. 1 shows a vehicle 1 and a mobile terminal device 2 designed as a Smartphone to carry out the proposed method according to one preferred example embodiment of the invention in a schematic view.

The vehicle 1 has a vehicle locking system 3 to open and lock the vehicle 1, said system being configured to open or close windows, doors and tailgates (not shown) of the vehicle. The vehicle 1 furthermore has a computer-based controller 4 which is configured to communicate with the vehicle locking system 3 to open or lock the vehicle 1. The controller 4 furthermore has a WLAN communication module to set up a local radiocommunication network according to an IEEE-802.11 standard, a device for determining a location position of the vehicle 1 by receiving a global satellite navigation signal from a GPS, GLONASS, Galileo and/or Beidou satellite navigation system, and a GSM communication module for exchanging data by means of a mobile radiocommunication standard. The Smartphone 2 is similarly provided with a WLAN communication module, a motion sensor 6, a device for determining a location position of the Smartphone 2 and a GSM communication module.

A WLAN hotspot which extends in a surrounding area 5 around the vehicle 1 is set up by means of the WLAN communication module of the vehicle 1. In a following method step, a check is carried out by the Smartphone 2 to determine whether the Smartphone 2 is located in the surrounding area 5 of the vehicle 1. If so, the Smartphone 2 authorizes itself in relation to the vehicle 1 by means of a WPA2 security key to set up a secured wireless point-to-point, two-way communication connection between the Smartphone 2 and the vehicle 1.

In a further method step, both the Smartphone 2 and the vehicle 1 determine the respective current location position by means of the respective device for determining the location position. The Smartphone 2 transmits the current location position determined in this way via the secured wireless point-to-point, two-way communication connection to the vehicle 1. The controller 4 of the vehicle 1 then determines a difference between the current location position of the vehicle 1 and the current location position of the Smartphone 2 in order to check whether the difference falls below or exceeds a predefined value. If said difference falls below the predefined value, the controller 4 causes the vehicle locking system 3 to open the vehicle. Otherwise, if the difference exceeds the predefined value, the controller 4 causes the vehicle locking system 3 to lock the vehicle 1.

By means of the proposed method, it is ensured through a two-stage process that only an authorized party, normally a driver of the vehicle 1 and owner of the Smartphone 2, can open and then start the vehicle 1. For this purpose, the Smartphone 2 is first authorized in relation to the vehicle 1 using the security key and, if the Smartphone 2 is located within a tolerable distance as the distance between the current location position of the vehicle 1 and the current location position of the Smartphone 2, the vehicle 1 is opened. It is thus ensured that only the authorized party gains access to the vehicle 1.

The vehicle 1 can be opened or locked only if the distance between the Smartphone 2 and the vehicle 1 decreases or increases, i.e. the difference between the current location position of the vehicle 1 and the current location position of the Smartphone 2 decreases or increases. If the owner of the Smartphone 2 moves out of the surrounding area 5, as a result of which the secured wireless point-to-point, two-way communication connection between the Smartphone 2 and the vehicle 1 is interrupted, it can similarly be provided that the controller 4 effects the locking of the vehicle 1 by means of the vehicle locking system 3.

When the vehicle 1 is opened or locked, a notification can similarly be sent from the controller 4 of the vehicle 1 to the Smartphone 2 and can be output as a visual, audible and/or vibration signal on the Smartphone 2. The owner of the Smartphone 2 is thus informed of the opening or locking of the vehicle 1. However, if the vehicle 1 is opened by an unauthorized third party, following acknowledgement of the notification by the authorized party on the Smartphone 2, a locking notification can be transmitted from the Smartphone 2 to the vehicle 1 on the basis of which the controller 4 effects the locking of the vehicle 1 by the vehicle locking system 3. Since the Smartphone 2 may be located outside the surrounding area 5, the notification can be transmitted to the vehicle 1 via the GSM communication module of the Smartphone 2.

In a comparable manner, an ignition of the vehicle 1 to start the vehicle 1 can be released only if the driver is located on a driver's seat of the vehicle 1. For this purpose, by setting up a secured near-field communication connection by means of an NFC protocol, it is verified whether the Smartphone 2 is located within a predefined distance of, for example, 1 m from a vehicle passenger compartment. The near-field communication connection can be triggered by the vehicle 1 by means of a secured code transmission similar to radio door locks known from the prior art, in particular only by the driver's own vehicle 1.

The security key, which may similarly comprise a TLS or PGP certificate, can be generated by the controller 4 of the vehicle 1 in a simple manner and independently from external server infrastructures, and can be displayed on an instrument cluster of the vehicle 1. The security key generated in this way can be scanned in from the instrument cluster by the Smartphone 2 and can be transmitted accordingly onto the Smartphone 2 and can be installed there.

If a current location position of the Smartphone 2 or of the vehicle 1 is not available, for example because the owner and driver of the Smartphone 2 and the vehicle 1 is located inside a building, following the reception of a manual confirmation on the Smartphone 2, a manually confirmed location position of the Smartphone 2 can be transmitted to the vehicle 1 as the current location position of the Smartphone 2. Alternatively, following corresponding manual confirmation on the Smartphone 2, a last-known location position of the Smartphone 2 can also be transmitted from the Smartphone 2 to the vehicle 1 via the secured wireless point-to point, two-way communication connection as the current position.

The example embodiment described is merely an example which can be modified and/or supplemented in various ways in the context of the claims. Every feature that has been described for a specific example embodiment can be used independently or in combination with other features in any other example embodiment. Every feature that has been described for an example embodiment of a specific category can also be used in a corresponding manner in an example embodiment of a different category.

REFERENCE NUMBER LIST

Vehicle 1
Smartphone, mobile terminal device 2
Vehicle locking system 3
Controller 4
Surrounding area 5
Motion sensor 6

We claim:

1. A method for the intervention-free control of a vehicle locking system with a mobile terminal device, whereby
   the mobile terminal device comprises a satellite signal receiver for receiving a GPS, GLONASS, Galileo, Beidou and/or further satellite signal for determining the current location position of the mobile terminal device, with the following steps:
   generating a security key, in particular a transport layer security (TLS) or a pretty good privacy (PGP) certificate, in the vehicle,
   displaying of the security key by the vehicle,
   scanning in by the mobile terminal device of the security key displayed by the vehicle, and/or
   transmitting the security key from the vehicle onto the mobile terminal device,
   checking whether the mobile terminal device is located in a surrounding area of the vehicle,
   if so, authorizing the mobile terminal device in relation to the vehicle by means of a secured wireless point-to-point, two-way communication connection secured with the security key,
   transmitting the current location position of the mobile terminal device from the mobile terminal device via the secured wireless point-to-point, two-way communication connection to the vehicle,
   opening or locking the vehicle by means of the vehicle locking system if a difference between the current location position of the vehicle and a current location position of the mobile terminal device falls below or exceeds a predefined value in the surrounding area, and
   following the opening or locking of the vehicle, transmitting a notification from the vehicle to the mobile terminal device and outputting the notification as a visual, audible and/or vibration signal on the mobile terminal device.

2. The method according to claim 1, wherein the current location position of the mobile terminal device is transmitted only if the location position of the mobile terminal device changes or a location position determined by a motion sensor of the mobile terminal device changes simultaneously with a location position determined from a satellite signal received by the mobile terminal device.

3. The method according to claim 1, with the following step:
   opening or locking the vehicle if the difference between the current location position of the vehicle and the current location position of the mobile terminal device decreases or increases in the surrounding area.

4. The method according to claim 1, with the following step:
   when the vehicle is opened, transmitting a notification from the vehicle to the mobile terminal device, outputting the notification as a visual, audible and/or vibration signal on the mobile terminal device, and, when the notification is acknowledged, transmitting a locking notification from the mobile terminal device to the vehicle, and locking the vehicle by means of the vehicle locking system.

5. The method according to claim 1, with the following step:
   following the opening of the vehicle, checking whether a driver is located on a driver's seat of the vehicle and, if so, releasing an ignition of the vehicle to start the vehicle.

6. The method according to claim 1, with the following step:
- checking whether a secured near-field communication connection is possible between the mobile terminal device and the vehicle in a vehicle passenger compartment and, if so, releasing an ignition of the vehicle to start the vehicle, and/or
- triggering of the near-field communication connection by the vehicle by means of a secured code transmission to the mobile terminal device.

7. The method according to claim 1, with the following step:
- if the mobile terminal device is not located in the surrounding area, locking the vehicle by means of the vehicle locking system.

8. The method according to claim 1, with the following step:
- determining the location position of the mobile terminal device and/or the vehicle by means of a satellite signal currently received by the mobile terminal device and/or the vehicle.

9. The method according to claim 1, with the following step:
- if the current location position of the mobile terminal device is unavailable, after receiving a manual confirmation on the mobile terminal device, transmitting to the vehicle a manually confirmed location position of the mobile terminal device or a last-known location position of the mobile terminal device from the mobile terminal device via the secured wireless point-to-point, two-way communication connection as the current location position of the mobile terminal device.

10. The method according to claim 1, with the following step:
- when transmitting the current location position of the mobile terminal device from the mobile terminal device via the secured wireless point-to-point, two-way communication connection to the vehicle, determining the current location position of the mobile terminal device.

* * * * *